Figure 12:
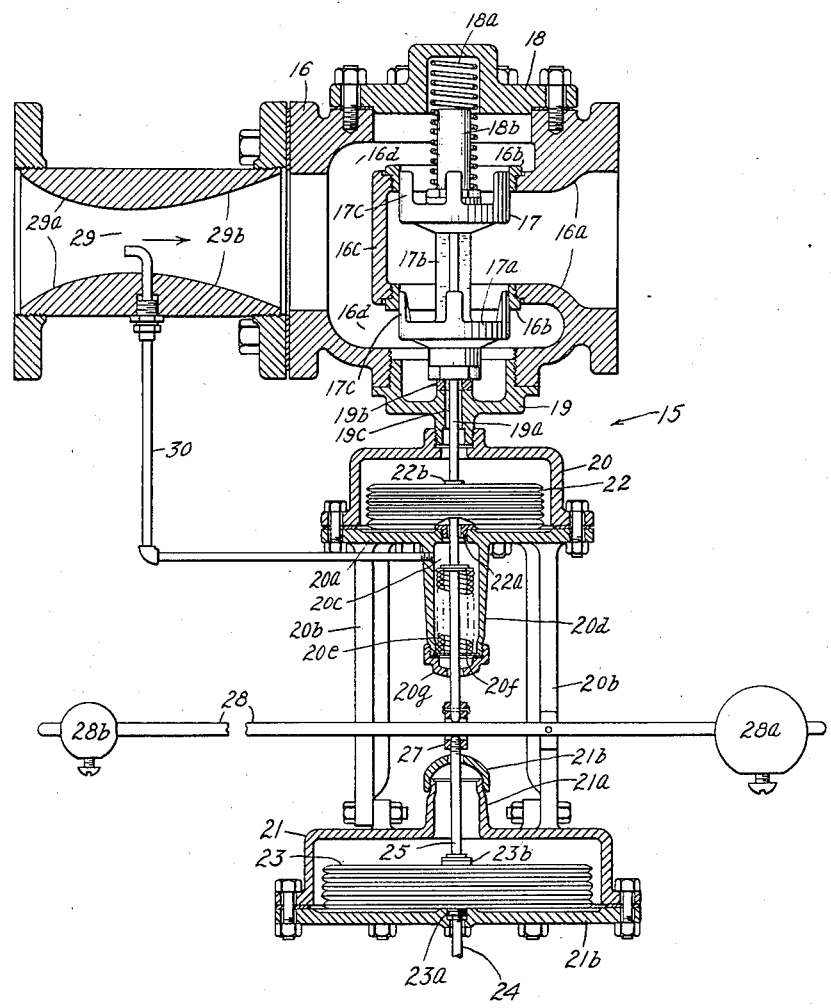

Oct. 12, 1937.  H. J. C. WELLS  2,095,656
HEATING SYSTEM
Filed July 23, 1934  3 Sheets-Sheet 1
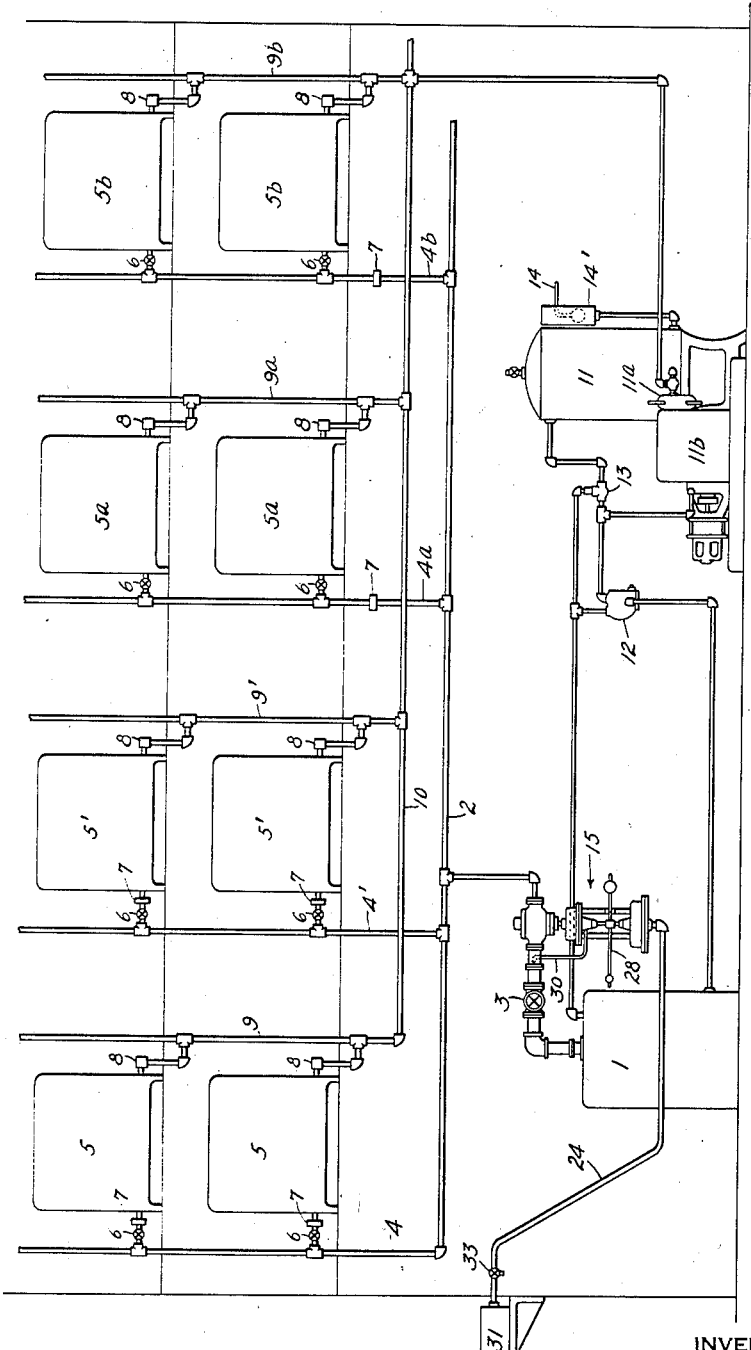
FIG. I
INVENTOR
Herbert J. Clement Wells
BY
Lawrence K. Sager
his ATTORNEY Oct. 12, 1937.                    H. J. C. WELLS                    2,095,656
                                  HEATING SYSTEM
                                Filed July 23, 1934                3 Sheets—Sheet 2
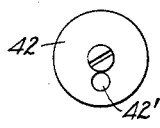
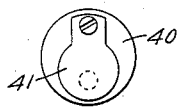
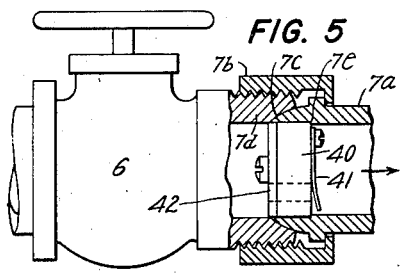
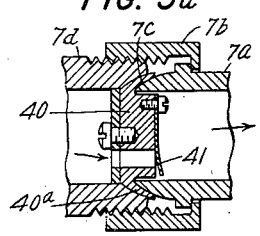
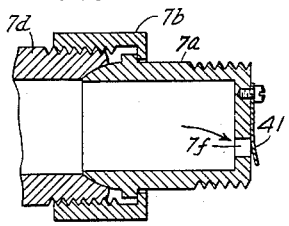
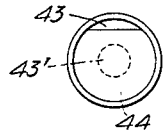
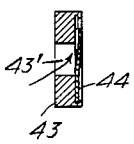
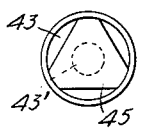
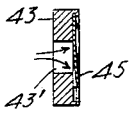
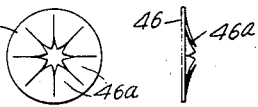
INVENTOR
Herbert J. Clement Wells
BY Lawrence K. Sager
his ATTORNEY Oct. 12, 1937.   H. J. C. WELLS   2,095,656
HEATING SYSTEM
Filed July 23, 1934   3 Sheets-Sheet 3

INVENTOR
Herbert J. Clement Wells
BY
Lawrence K. Sager
his ATTORNEY

Patented Oct. 12, 1937

2,095,656

UNITED STATES PATENT OFFICE 2,095,656

HEATING SYSTEM

Herbert J. Clement Wells, Jackson Heights, N. Y.

Application July 23, 1934, Serial No. 736,507

5 Claims. (Cl. 237—9)

This invention relates to automatic and graduated control of the heating medium in heating systems wherein the heating medium is controlled, in its distribution to individual heating elements, or to different groups of elements, in approximately direct proportion to any change imposed upon the heating system. This improvement comprises the combination in the heating system of automatic graduating valves which control the distribution of the heating medium, such as steam, to the different heating elements of the system.

The improvement is applicable where the steam pressure at the source of supply is variable, either automatically such as by controlling means responsive to change of temperature at a key location, as, for example, change in external atmospheric temperature at a selected location, or where the steam pressure is manually or otherwise changed to meet the heating requirements. It is also applicable where the volume of steam supplied is similarly automatically, manually, or otherwise controlled.

It has been proposed to use restricted orifices for controlling the distribution of the steam to the different heating elements of the system, such orifices being so proportioned, in their fixed inlet area to the heating elements, as to control the distribution of the heating medium to give a desired proportionate distribution, either under a fixed pressure of the source of supply or under a controlled pressure of the source of supply. When using such proportioned fixed inlet orifices, the results are unsatisfactory because they do not properly respond to change of pressure imposed upon the system or to change of volumetric supply, neither for the purpose of maintaining a proper proportionate distribution to the different heating elements nor for obtaining distribution of the heating medium in proportion to the change of controlling pressure or volume of the supply.

The present invention will be understood from the following description and accompanying drawings wherein Figure 1 is a diagram illustrating a heating system embodying the invention; Fig. 2 is a face view of one form of graduating valve; Fig. 3 is a vertical section thereof; Fig. 4 is a rear elevation thereof; Fig. 5 is a side view of the usual manual radiator inlet valve having incorporated therewith the graduating valve of Figs. 2 to 4; Fig. 5a is a vertical section showing another way of mounting the graduating valve; Fig. 5b is a vertical section showing the graduating valve incorporated with the nipple of the union; Fig. 6 is a face view of another form of graduating valve and Fig. 7 is a vertical section thereof; Fig. 8 is a face view of another form of graduating valve and Fig. 9 is a vertical section thereof; Fig. 10 is a face view of still another form of graduating valve and Fig. 11 is a side view thereof; and Fig. 12 is a vertical section of an automatic valve for adjusting the volume of steam supplied to the system in response to temperature changes at a key location.

Referring to Figure 1, a heating system is indicated, the source of supply of the heating medium being shown as a boiler 1 which supplies steam to a supply main 2 through the usual manual valve 3. A riser 4 is shown connected to this main and extends upwardly to supply a plurality of heating elements or radiators 5, two of such radiators being indicated. From the main 2 also extends another riser 4', which is indicated as supplying another series of radiators 5', two of these being indicated on the drawings. The connection to each radiator is shown as including the usual hand stop valve 6 and also is provided in each inlet connection with a graduating valve of this invention indicated as inserted at 7 at the outlet end of the hand valve 6. The usual steam trap 8 is connected in the outlet of each radiator and these are in turn connected respectively to the return pipes 9 and 9' which in turn are connected to a common return 10. Risers 4a and 4b are shown supplying radiators 5a and 5b respectively; and these groups are respectively controlled by graduating valves 7 in the supply pipe to each group. The returns 9a and 9b are connected to the common return. The return is connected to the condensate reservoir 11 through a strainer 11a and through a pump 11b. The outlet of this pump is connected with the top of the reservoir 11 and also to a device 12 which automatically feeds return water to the boiler for maintaining the water therein at a predetermined level. Pipes connect the upper and lower portions of the boiler with the level maintainer 12 in order to equalize the pressure therein and insure the proper water level. Excess water is maintained in the reservoir 11 and a surplus pressure valve 13 insures sufficient pressure being maintained in the pump discharge for overcoming the pressure in the boiler to permit the passage of water thereto as controlled by the water level maintainer 12. An auxiliary supply pipe 14 is connected to the reservoir 11 through any suitable form of water level maintaining device 14' for the purpose of supplying water to the reservoir as required in order to maintain a predetermined water level therein.

In the particular heating system disclosed in Fig. 1, the volume of the heating medium supplied to the system is varied in response to change of temperature at a key location by means of the volumetric regulating valve 15 located in the supply main. Thus, if the valve 15 be adjusted to give a comparatively high volume of steam delivery, the temperature of the radiators will be correspondingly raised and the heat delivered by them for extreme weather conditions be increased. Similarly, under warmer weather conditions, the volume will be changed to a lower amount and the heat delivered by the radiators will be decreased. A preferred form of construction of the valve 15 is shown in Fig. 12 and is disclosed and claimed in its general applications in the pending application of Thomas N. Adlam, Serial No. 649,553, filed December 30, 1932, now matured into Patent No. 2,053,759, dated Sept. 8, 1936.

Referring to Fig. 12, the valve has a main body portion 16 provided with flanges for connection to the supply pipe. Within the body of the valve are upper and lower portions 16a each having threaded central openings for receiving collars 16b which latter serve as guides for the movable element of the valve. The inlet side of the valve is closed by a vertical partition 16c extending between the partitions 16a, openings 16d being provided in the upper and lower partitions 16a at the inlet side to permit the steam to pass into the spaces between the partitions 16a and the top and lower body portions of the valve. The valve element is shown formed of two parts 17 and 17a having their main portions connected by the stem 17b. The parts 17 and 17a are provided with upward extensions 17c with circumferential openings between them, the extensions being slidable within the collars 16b. Evidently when the valve is moved downwardly the steam may pass through these openings and through the two collars to the outlet side of the valve. When the valve is moved upwardly, the volume of the steam supplied is gradually reduced until the portions 17 and 17a engage the collars 16b, at which time the valve is closed.

On the top of the valve is a removable cap 18 having a cylindrical inner cavity in which a spring 18a is seated. This spring extends downwardly and freely around a cylindrical guide 18b carried by the movable valve element and engages the upper end of the movable element of the valve. This spring, unless otherwise opposed, will move the valve to its full open position. At the lower portion of the body of the valve is a threaded opening in which is seated a cap 19 and through which freely passes the extension 19a of the valve stem. The cap 19 limits the open position of the valve by the same coming against inner projections 19b of the cap.

A cylindrical casing 20 having a lower open end has a top enclosing portion, the top having a central opening for the passage of the valve stem extension. The top portion of the casing is provided with an internally threaded boss which has a threaded engagment with the lower extension of the cap 19 and is thus supported from and by the cap 19. The lower end of the casing 20 is closed by a plate 20a bolted thereto as shown with a gasket to form an air-tight joint, and the plate is provided with depending brackets 20b which support at its lower ends another cylindrical casing 21 open at its lower end and having its top portion closed except for an opening formed by an upper cylindrical extension 21a. The bottom of the casing 21 is closed by a circular plate 21b bolted to its lower end as shown with a gasket to form a tight joint.

Within the casing 20 is an expansible and compressible element 22 of the bellows type. This is supported and sealed at its lower end by a central nipple 22a which is screwed into the plate 20a to form a tight joint. The nipple 22a has a central opening so that the interior of the bellows is in communication by a passage through the plate 20a with a chamber 20c formed by a central tubular extension 20d from the bottom of the plate 20a. The top of the bellows 22 is closed and fixed at 22b to the valve rod 19a. Thus when the pressure within the bellows 22 exceeds the external pressure thereon, the expansion of the bellows will tend to move the rod 19a upwardly and tend to close the valve. The internal pressure is dependent upon the static steam pressure plus the pressure due to the velocity head of the steam, as later explained. The pressure exerted upon the exterior of the bellows 22 corresponds with the static pressure of the steam or vapor within the chamber of the body of the valve because the interior of the chamber 20 is in communication therewith by a passage 19c through which the valve rod extension 19a freely passes.

The valve rod 19a extends downwardly through the tube 20d and through an expansible and contractible bellows 20e. The upper end of this bellows is closed and secured to the valve rod and its lower end is open and secured to a plate 20f having a central opening and having its outer portion clamped with a gasket to form a tight joint between a cap 20g and the lower end of the tube 20d by a threaded engagement of the cap with the tube. The cap 20g has a central opening through which the rod 19a freely passes. Thus the inside of the bellows 20e is subjected to atmospheric pressure and the exterior to the pressure within the chamber 20c, the bellows thus serving as a seal of the chamber 20c and interior of the bellows 22 from atmospheric pressure.

Within the casing 21 is another expansible and compressible element 23 of the bellows type, the lower end of which is closed and carries a central nipple 23a having a tight threaded joint with the plate 21b. The interior of the bellows 23 is thus sealed from pressure within the casing 21. The plate 21b has a central opening to receive the end of a tube 24 which has a threaded engagement with the interior of the nipple 23a. Thus any pressure exerted within the tube 24 is transmitted to the interior of the bellows 23. The top of this bellows is closed, but has secured thereto at its center a disk 23b to which is fixed an upwardly extending rod 25 which passes centrally through the extension 21a. The extension is closed by a cap 21b through which the rod 25 freely passes. Thus the exterior of the bellows 23 is exposed to atmospheric pressure.

The upper end of the rod 25 has a threaded engagement with and passes through the lower side of a ring 27. The lower end of the rod 19a passes through the upper side of this ring and is secured thereto. A lever arm 28 is pivotally mounted on one of the brackets 20b and passes axially through the ring 27 and is engaged therein by the rounded ends of the rods 19a and 25. The lever 28 is weighted at one end by an element 28a which is adjustable lengthwise on the lever 28. This weight obviously exerts an upward pressure on the valve rod 19a tending to close the valve against the pressure of the spring 18a. The opposite end of the lever 28 carries another weighted element 28b of small weight compared to that of the element 28a and is adjustable along the lever 28 for refined adjustment of the upward pressure of this lever upon the valve rod.

In the main supply pipe, shown at the incoming end of the valve in Fig. 12, is a section provided with a definitely formed opening 29 or throat, preferably in the form of a Venturi tube with converging entrance walls 29a and diverging outlet walls 29b, although it may be of other shape. Opposite this throat is an axially extending tube 30, its location being such that the pressure in this tube responds to change of velocity head of the heating medium through the throat 29. This tube passes out through the supply pipe and is connected at its other end to the chamber 20c of the valve which results in the bellows 22 being subjected to an inside pressure corresponding to the velocity pressure imposed upon the tube 30. This tube and the interior of the bellows 22 will also be subjected to the static pressure of the steam, but the static pressure is offset or counteracted by the pressure exerted upon the exterior of the bellows 22, because it receives the static pressure of the heating medium owing to the interior of the casing 20 being in direct communication with the space within the body of the valve, as already explained. Thus the bellows 22 is directly responsive in its upward pressure tending to close the valve, to any change in the velocity or volume of steam passing through the throat 29.

Now referring to Fig. 1, the volume control valve is shown as having the pipe 30 connected as just described, and Fig. 1 also shows the pipe 24 connected with the interior of a temperature responsive pressure device 31. This may be any form of thermostatic device in which the pressure exerted will correspond to change of temperature. The drawings show the preferred form of this device as being an airtight box or drum, the pressure of which is communicated through the pipe 24 to the interior of the bellows 23. This may contain air or any gas whose expansive pressure varies directly with change of temperature. This device 31 may be located in any key position for controlling the volume of heating medium supplied to the radiators and is preferably located out-of-doors so that the volume of heat supplied with change of weather will correspond to the changes of the out-of-doors temperature. Sufficient air is pumped into the container 31 in any convenient way, such as through the valve 33 in the pipe 24 so that the controlling valve will function as desired. This form of thermostatic controlling means may therefore be readily adjusted and kept in proper working condition simply and conveniently by anyone in charge, without the necessity of bothering with volatile liquids or electrical contrivances.

The throat 29 is calibrated to create a definite velocity of the steam when the system is taking its maximum demand in extreme weather and with the controlling valve fully open. Under such conditions the pressure of the air in the reservoir 31 is not sufficient, together with the upward force exerted by the lever 28 and the upward force due to the velocity head in the pipe 30 within the bellows 22, to overcome the weight of the valve and pressure of the spring 18a. The valve under these extreme weather conditions will then allow just a sufficient quantity of steam to pass through the throat 29 at a definite velocity which will be just sufficient to supply the required heat to meet these extreme weather conditions. When the temperature rises, the air or gas in the reservoir 31 expands and causes the pressure within the bellows 23 to increase and move the valve in a direction tending to close it. With a certain increased pressure in the bellows 23 corresponding to a certain temperature of the drum 31, the valve will automatically deliver a certain volume of steam corresponding to that temperature. Thus assuming a certain pressure in bellows 23 tending to close the valve, the velocity head imposed upon the tube 30 will responsively exert a certain pressure within the bellows 22 and the valve will assume a normal position corresponding to the outside temperature. If while the external temperature and the pressure in the bellows 23 remains constant, the volume of the heating medium passing through the valve should from any cause decrease slightly from the normal amount, the velocity head imposed upon the tube 30 would decrease slightly and lower the pressure in bellows 22 and permit the valve to open somewhat more and so restore the volume delivered to its normal amount. If the volume delivered should exceed the normal, the velocity head increases in tube 30 and serves to move the valve somewhat towards its closed position and thus maintains delivery of a substantially constant volume of steam regardless of other changes provided the outside temperature and pressure in bellows 23 remains constant. When the outside temperature and pressure in bellows 23 change, the valve will assume a new intermediate balanced position corresponding thereto and automatically be controlled to deliver a volume of steam of substantially constant amount corresponding to just the amount required by the external temperature.

Thus the velocity of steam through the throat 29 and consequently the volume of the heating medium supplied to the radiators is controlled to correspond with the amount required and to deliver sufficient heat corresponding with the changes in weather conditions, while at the same time avoiding any excess or waste. This control also has the advantage of being independent of changes in initial steam pressure or changes in back pressure due to any variations therein from various causes. The method of control and the controlling means or apparatus is therefore a velocity and volume control of the heating medium supplied from the main source, as distinguished from steam pressure regulation.

By my present improvement, I incorporate in the above described system, my improved graduating distribution valves in the inlets to the heating elements, or groups thereof, of the system. Thereby the amount of the heating medium delivered to the radiators, or groups thereof, is respectively controlled to be approximately in direct proportion to any change of volume of the steam delivered to the system by the regulating valve 15. Likewise, upon any change of volume supplied, the proper proportionate distribution to the various radiators of the system is properly maintained during the change of volume adjustment as well as during continued periods of fixed conditions.

Figs. 2 to 5 show one preferred form of the graduating valve adapted to be inserted at the locations 7 of Fig. 1. The valve is shown as formed of a circular disc 40 having an opening 40' at one side of the center of the disc. This opening is relatively small compared with the size of the inlet pipe. A flexible thin sheet of metal 41 forms the movable element of the valve and is secured at one end to the disc 40 and has an enlarged portion which extends over the opening 40'. The disc 40 is preferably made of brass or similar material and the flexible element 41 is preferably made of "Monel metal" or bronze or similar material which will not materially oxidize under normal use and also has proper flexibility for securing the desired control. The opening 40' must be of sufficient size to supply the maximum amount of heating medium to the radiator under maximum heating requirements and adjustment of this opening may be made conveniently by a thinner brass disc 42 mounted by a central screw on the opposite side of the disc 40 from the flexible element 41. The disc 42 has an opening 42' of the same size as the opening 40'. Where the heating medium required to be delivered to any particular radiator is lower than that permissibly attainable through the opening 40', the disc 42 may be adjusted by loosening the central holding screw, and turning the disc 42 so as to partially close the opening 40' to the desired amount and then tightened in its adjusted position.

Fig. 5 shows how the graduating valve, or graduator, is conveniently mounted in the inlet to the radiator at the union 7 between the hand valve 6 and the radiator. The pipe 7a is connected directly to the radiator and the usual internal threaded coupling nut is shown at 7b drawing the parts together to make a tight fit between the curved engaging surfaces 7c of the end of the pipe 7a and the pipe extension 7d of the hand valve. For the purpose of receiving the graduating valve, the interior of the outer end of the pipe 7a is slightly cut away so as to form a shoulder 7e. The graduating valve may then be seated against this shoulder and nicely fitted within the enlarged opening in the end of the pipe 7a, as shown in Fig. 5. It thus occupies a small space and avoids the necessity of providing extra fittings or connections.

Fig. 5a shows another form of this graduator adapted for mounting in a different manner in the inlet. Here the disc 40 is provided with an outwardly extending curved flange 40a adapted to fit and be clamped between the curved engaging portions of the union at the joint 7c. The graduator is thus conveniently mounted and held in fixed position without the necessity of machining the interior of the pipe 7a. Fig. 5b shows the graduating valve as forming a part of the nipple 7a of the union. Here the nipple is closed at the inner end except for an opening 7f controlled by the flexible element 41 mounted on the inner end of the nipple 7a.

In some cases the hand valve 6 may be omitted entirely. Also, the graduating valve may obviously be placed in the intake side of the hand valve instead of in the outlet side. It is also evident that one graduator may sometimes be used to control the heating medium supplied to two or more radiators, as indicated in the upper right hand side of Fig. 1.

The direction of flow of the heating medium through the graduating valve is such that it tends to open it, as indicated by the arrows in Figs. 3 and 5. The graduating valve is responsive, in the degree of its opening, throughout substantially the whole dynamic pressure range of the system, to the dynamic pressure exerted on the flexible element of the valve by the heating medium passing through the valve. The relatively small size of the opening 40' with reference to the size of the inlet pipe results in the heating medium which passes through the opening 40' having a high velocity compared to that of the medium when passing through the inlet pipe. By reason of this high velocity, the heating medium imposes upon the flexible disc a dynamic pressure which serves as the controlling factor and this varies according to the heating requirements. In the case of a volumetric system of control, as herein previously described, when the heating requirements are low, the regulating valve 15 will, as already explained, automatically supply a comparatively low volume of steam to the system. Under such conditions the graduating valves each open a small amount in response to the low supply of the heating medium. Thus the radiators near the source receive only a limited amount of steam due to the small opening of the graduators near the source and permit the more distant radiators to be supplied with their full requirements upon the initial supply of steam. Thus a uniform and simultaneous distribution of the steam is made to all parts of the system during the initial warming up process, as distinguished from the condition of using fixed openings to the radiators and allowing the radiators near the source to rob the more distant radiators of their prompt supply of the heating medium. When the regulating valve 15 opens further in response to increased heating requirements, the graduating valves throughout the system will respond to the increased volume of steam supply by causing the movable elements 41 to open a corresponding further amount. This results in a simultaneous distribution of the proper increased amount of steam to all the radiators, as distinguished from an unbalanced initial distribution when fixed openings to the radiators are used. Similarly, when the volume of steam supply is further increased or decreased due to control by the regulating valve 15, the graduators will respond accordingly giving all radiators of the system a uniform and prompt supply of steam in accordance with the particular heat requirements of each. Moreover, by proportioning the flexible element as to thickness and as to size of its reduced neck portion and as to quality of material as regards flexibility in well understood ways, the response of the graduating valves are caused to be in direct proportion to the change of volume of the steam supplied by the regulator 15, resulting in the heating of the radiators being in direct proportion to the required heating as determined by the temperature at the key location. This is in contrast to the conditions when fixed openings to the radiators are used, in which case the steam delivered to the radiators is usually excessive under low heating requirements and insufficient under high heating requirements.

This invention is likewise applicable where a pressure system of control of the source is used, as distinguished from volumetric control, the graduating valves responding to dynamic pressure changes of the heating medium passing through the graduating valves in response to automatic pressure regulation, as well as when adjustment of the supply is made manually or otherwise for increasing or decreasing the heating requirements.

Various forms of graduators may be used. In Figs. 6 and 7 it is shown formed of a disc 43 having a control opening 43' and a thin flexible element 44 held in place by crimping the edge of the disc 43 around the periphery of the disc 44.

A segment of the disc 44 is cut away, as shown at the top of the figures. The direction of the flow of steam through the valve is shown by the arrow in Fig. 7. At low volumetric supply from the source, or at low pressure at the source of steam supply, the flexible element 44 is pushed by the dynamic pressure slightly away from the disc 43 at the middle portion and the steam passes through the opening 43' and between disc 43 and element 44 out through the segmental opening to the radiator. With increased supply from the source, the flexible element 44 is responsively pushed open a correspondingly increased amount according to the heat requirements. The valve is mounted in the inlet to the radiator as shown in Fig. 5 and may be provided with a flange for mounting as shown in Fig. 5a.

Figs. 8 and 9 show a somewhat similar form of valve wherein the flexible element is of a general triangular form having its end portions extending under and held in place by the crimped-over edge of the disc 43. The steam in its passage through the valve pushes the element 45 away from the disc 43 at its central portion according to the dynamic pressure of the steam imposed thereon, and passes from the opening 43' out through the three segmental spaces shown.

Figs. 10 and 11 show another form of graduating valve formed of a single circular piece 46 of thin flexible metal. It is cut from the center outwardly to form a number of sectors 46a; but the cuts do not extend to the rim. In the passage of the steam through the valve, the sectors are bent, in response to change of the dynamic pressure of the passing steam, in a graduated amount to give a corresponding distribution to the radiators in approximately direct proportion.

Many other forms of graduating valves may obviously be used; and it will be understood that various modifications and adaptations of the heating system and various different combinations and relationships may be developed for particular heating systems without departing from the scope of this invention.

I claim:—

1. In a heating system comprising a plurality of heating elements, inlet valves for controlling the distribution of the heating medium to said elements respectively, each of said valves comprising a fixed element having an opening and a flexible element of sheet metal form opposite said opening and located at the rear of said fixed element for increasing the degree of opening of said valve with increase of dynamic pressure of the ingoing heating medium continuously under all operating conditions.

2. In a heating system comprising a plurality of heating elements, inlet valves for controlling the distribution of the heating medium to said elements respectively, each of said valves comprising a fixed element having an opening and a flexible element of sheet metal form opposite said opening and located at the rear of said fixed element for increasing the degree of opening of said valves in response to increase of dynamic pressure of the ingoing heating medium continuously under all operating conditions of the system, and automatic means for regulating the supply of the heating medium to said valves according to change of temperature at a key location.

3. In a heating system comprising a plurality of heating elements, inlet valves for controlling the distribution of the heating medium to said elements respectively, each of said valves comprising a fixed element having an opening and a flexible element of sheet metal form opposite said opening and located at the rear of said fixed element for increasing the degree of opening of said valves with increase of dynamic pressure of the ingoing heating medium continuously under all operating conditions of the system, and means for adjusting the size of opening of said fixed elements.

4. In a heating system, the combination with a plurality of heating elements of inlet valves in the inlet pipes controlling the distribution of the heating medium to said elements respectively, said inlet valves each comprising a portion having a small opening as compared with the size of the inlet pipe and a flexible element of sheet metal form opposite the rear of said opening subjected to the dynamic pressure of the heating medium for opening the valve to a greater degree the greater said dynamic pressure under all operating conditions.

5. In a heating system, the combination with a plurality of heating elements of inlet valves in the inlet pipes controlling the distribution of the heating medium to said elements respectively, said inlet valves each comprising a portion having a small opening as compared with the size of the inlet pipe and a flexible element of sheet metal form opposite the rear of said opening subjected to the dynamic pressure of the heating medium for opening the valve to a greater degree the greater said dynamic pressure under all operating conditions, and means for adjusting the size of said small opening.

HERBERT J. CLEMENT WELLS.